United States Patent
Tho et al.

(10) Patent No.: US 11,142,334 B2
(45) Date of Patent: Oct. 12, 2021

(54) BIRD IMPACT RESISTANT PROTECTION SYSTEM

(71) Applicant: Textron Innovations Inc., Providence, RI (US)

(72) Inventors: Cheng-Ho Tho, Colleyville, TX (US); Michael Reaugh Smith, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 561 days.

(21) Appl. No.: 15/846,783

(22) Filed: Dec. 19, 2017

(65) Prior Publication Data

US 2019/0185179 A1 Jun. 20, 2019

(51) Int. Cl.
*B64D 45/00* (2006.01)
*B64C 1/14* (2006.01)
*B64C 1/34* (2006.01)

(52) U.S. Cl.
CPC ............ *B64D 45/00* (2013.01); *B64C 1/1476* (2013.01); *B64C 1/1484* (2013.01); *B64C 1/1492* (2013.01); *B64C 1/34* (2013.01); *B64D 2045/0095* (2013.01)

(58) Field of Classification Search
CPC ............ B64D 45/00; B64D 2045/0095; B64C 1/1476; B64C 1/34
See application file for complete search history.

(56) References Cited

U.S. PATENT DOCUMENTS

| | | | | |
|---|---|---|---|---|
| 6,273,463 B1* | 8/2001 | Peterson | ............... | B60R 21/276 137/512.1 |
| 8,588,996 B2* | 11/2013 | Hill | ....................... | G05D 1/0055 701/3 |
| 8,616,144 B2* | 12/2013 | Yifrach | ............... | A01M 31/002 116/22 A |
| 8,979,023 B1* | 3/2015 | Wang | ....................... | B64C 25/56 244/100 A |
| 9,701,424 B2* | 7/2017 | Hausmann | ............... | B64F 1/005 |
| 9,997,078 B2* | 6/2018 | Gadgil | ................. | G08G 5/0052 |
| 10,017,263 B2* | 7/2018 | Litwinowicz | ............ | B64C 25/00 |
| 10,040,572 B2* | 8/2018 | Santana-Gallego | ... | B64D 45/00 |
| 10,391,960 B2* | 8/2019 | Settles | .................... | B64D 45/00 |
| 10,435,161 B1* | 10/2019 | LoPresto | ................. | B64D 45/00 |
| 2004/0107033 A1* | 6/2004 | Rao | ....................... | B60R 21/0134 701/45 |

(Continued)

*Primary Examiner* — Brian M O'Hara
*Assistant Examiner* — Keith L Dixon
(74) *Attorney, Agent, or Firm* — Whitaker Chalk Swindle & Schwa; Enrique Sanchez, Jr.

(57) ABSTRACT

An in-flight impact protection system for aircraft. An aircraft having a panel, with a sensor disposed on the aircraft and adapted to transmit a signal and receive a reflection of the signal. A controller coupled to the sensor and adapted to receive the reflection from the sensor to determine whether an object is near the aircraft's panel. An inflation device, which includes a tube member, is coupled to the controller and positioned inside the aircraft, proximate the panel. After determining that the object is near the panel, the controller can activate the inflation device so that the tube member inflates, thereby buttressing at least a portion of the panel. The panel can be a windshield, fuselage member, or other suitable component.

20 Claims, 7 Drawing Sheets

(56) References Cited

U.S. PATENT DOCUMENTS

2006/0091653 A1* 5/2006 De Mersseman ....... G01S 17/89
　　　　　　　　　　　　　　　　　　　　　　280/735
2010/0094508 A1* 4/2010 Kozyreff ............. B60R 21/0134
　　　　　　　　　　　　　　　　　　　　　　701/45

* cited by examiner

BIRD IMPACT RESISTANT PROTECTION SYSTEM

BACKGROUND

1. Field of the Invention

The present invention is generally related to aircraft protection systems, and more specifically to in-flight impact protection systems for aircraft.

2. Background of the Invention and Description of Related Art

While in flight, aircraft are susceptible to damage by objects that impact the aircraft's canopy or fuselage. Bird strikes are a particularly problematic for airborne aircraft. A bird strike can damage the windshield, break the windshield frame, bend the windshield retainer, and allow the bird to penetrate the cockpit. The area where the windshield meets the windshield frame is particularly challenging due to the dissimilar stiffness of the materials. Additional objects, such as large hail or airborne rocks and other debris can cause the same damage to the aircraft. If an object strikes the windshield, the windshield can deform and create a pocket, thereby causing 100% of the object's momentum to be transferred to the windshield and surrounding support structure. An object that penetrates the windshield can at a minimum distract the pilot, and at worst injure the pilot or damage critical aircraft components, resulting in a crash.

Traditional approaches addressing this issue include strengthening the windshield. Aircraft windshields are typically made of material such as coated acrylic plastic or laminated transparent materials composed of glass, polycarbonate, or other materials. In order to strengthen the windshield, the windshield is generally made thicker or from a stronger material. Such increase in thickness and/or strength can add unwanted byproducts, such as an increase in aircraft weight or optical distortion. This approach also makes the fuselage heavier by increasing the thickness or density of various fuselage members.

SUMMARY

The present invention achieves technical advantages as an in-flight impact protection system for aircraft. One exemplary embodiment of the invention discloses an aircraft having a panel. A sensor is also disposed on the aircraft and adapted to transmit a signal and receive a reflection of the signal. A controller is coupled to the sensor and adapted to receive the reflection from the sensor to determine whether an object is near the aircraft's panel. An inflation device, which includes a tube member, is coupled to the controller and positioned inside the aircraft, proximate the panel. After determining that the object is near the panel, the controller can activate the inflation device so that the tube member inflates, thereby buttressing at least a portion of the panel. The panel can be a windshield, fuselage member, or other suitable component.

In another exemplary embodiment of the invention, a windshield can be buttressed during impact, by transmitting a signal and receiving a reflection of the signal, determining whether an object is proximate a windshield based on the reflection, and buttressing a portion of the windshield when an object is proximate the windshield by deploying an inflation device. The inflation device can buttress a portion of the windshield with an inflated tube member. The tube member can be positioned within the aircraft so that the tube member can exert a force against a portion of the windshield when inflated. Advantageously, the force exerted against the windshield by the tube member can keep the object from penetrating the aircraft and maintain windshield integrity after the object impacts the windshield.

In yet another exemplary embodiment, aircraft having a panel. A sensor is also disposed on the aircraft and adapted to transmit a signal and receive a reflection of the signal. A controller is coupled to the sensor and adapted to receive the reflection from the sensor to determine whether an object is near the aircraft's panel. A rod is secured within the aircraft, near the windshield, with an inflation device disposed along a portion of the rod. The inflation device can be coupled to the controller and exert a force against a portion of the windshield when inflated.

Other advantages will be apparent to those of ordinary skill in the art.

DETAILED DESCRIPTION

The preferred version of the invention presented in the following written description and the various features and advantageous details thereof are explained more fully with reference to the non-limiting examples included in the accompanying drawings and as detailed in the description which follows. Descriptions of well-known components and processes and manufacturing techniques are omitted so as to not unnecessarily obscure the principle features of the invention as described herein. The examples used in the description which follows are intended merely to facilitate an understanding of ways in which the invention may be practiced and to further enable those skilled in the art to practice the invention. Accordingly, the examples should not be construed as limiting the scope of the claimed invention.

Figure 1A:
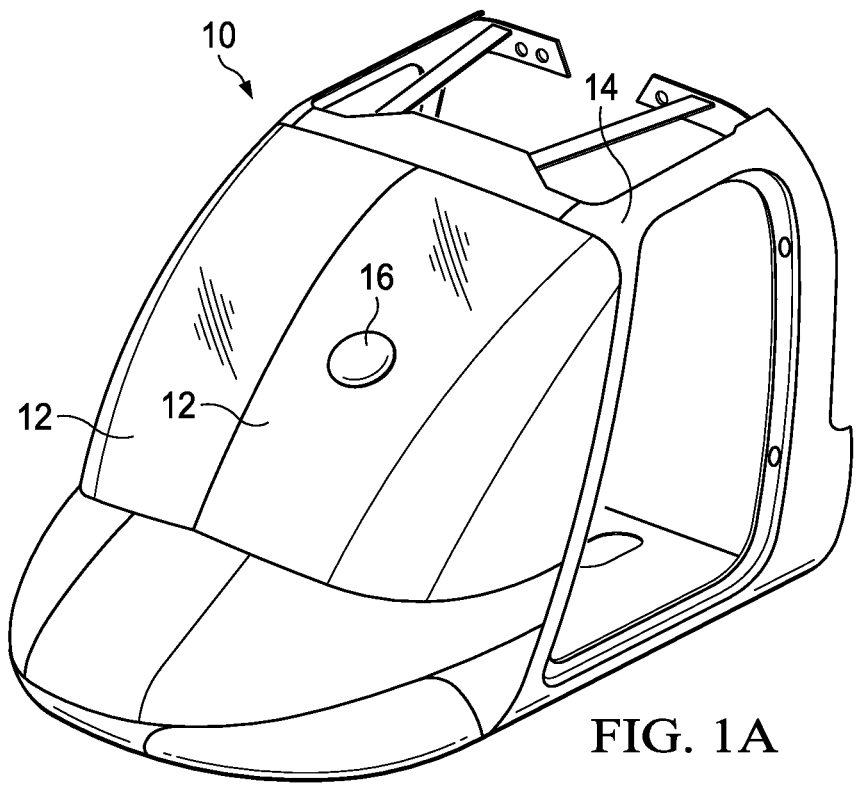
FIG. 1A is a perspective view of portions of an aircraft, showing an initial impact point of an object.

FIG. 1A is a perspective view of portions of an aircraft, designated generally as 10, showing an initial impact point of an object 16. Aircraft 10 includes panels 12 that make up the body of the aircraft. In one exemplary embodiment, the panels 12 can be a windshield, a fuselage member, or other suitable external component. The panels 12 can be disposed within an aircraft frame 14 directly or via joining components, such as windshield frames, retainers, or other suitable components. Upon impact by an object 16, the panel 12 can separate from the frame 14 and allow the object 16 to penetrate the aircraft 10. Alternatively, the object 16 can damage the panel 12, such that sensitive components within the aircraft 10 are damaged. In one embodiment, the object 16 can be a bird. Alternatively, the object can be hail, a rock, or other debris.

Figure 1B:
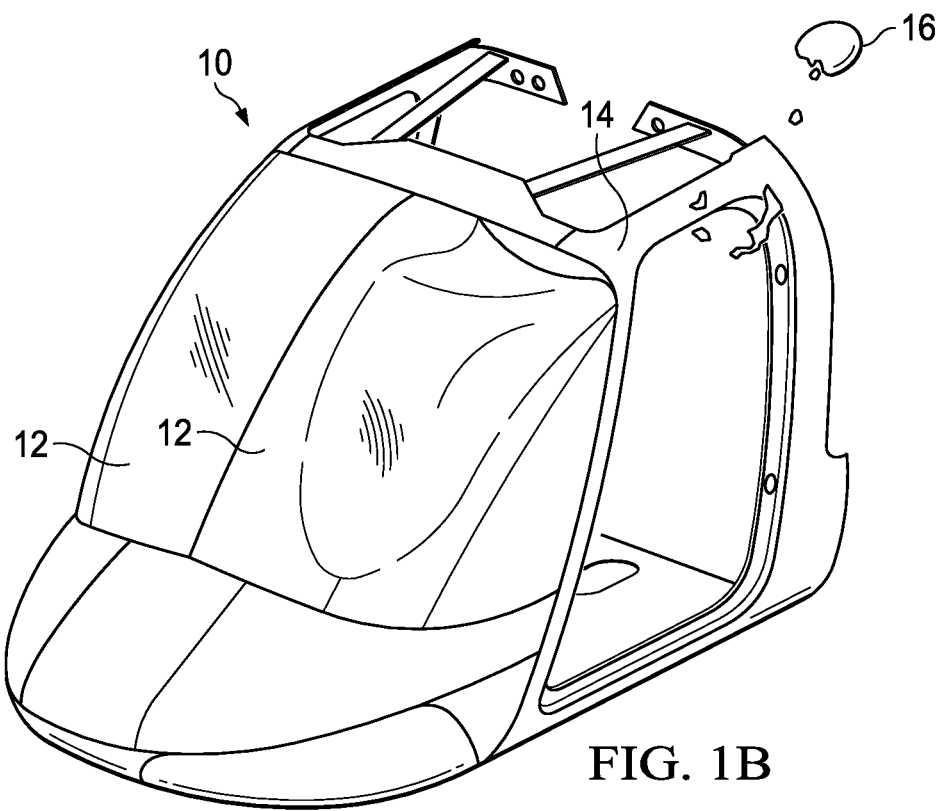
FIG. 1B is a perspective view of portions of an aircraft, after penetration of the cockpit by an object.

FIG. 1B is a perspective view of portions of an aircraft, after penetration of the cockpit by an object 16. After striking the panel 12, the object 16 can exert a force on the panel 12 as it slides up the panel 12. Although the panel 12 may be strong enough to prevent penetration of the object 16 therethrough, the force from the impact of the object 16 can deform the panel 12. As the object 16 slides up the panel 12, toward the point where the panel 12 is coupled to the aircraft frame 14, the panel 12 deforms. The panel 12 can deform such that the panel 12 detaches from the frame 14, allowing the object 16 to penetrate the cockpit of the aircraft 10.

Figure 2:
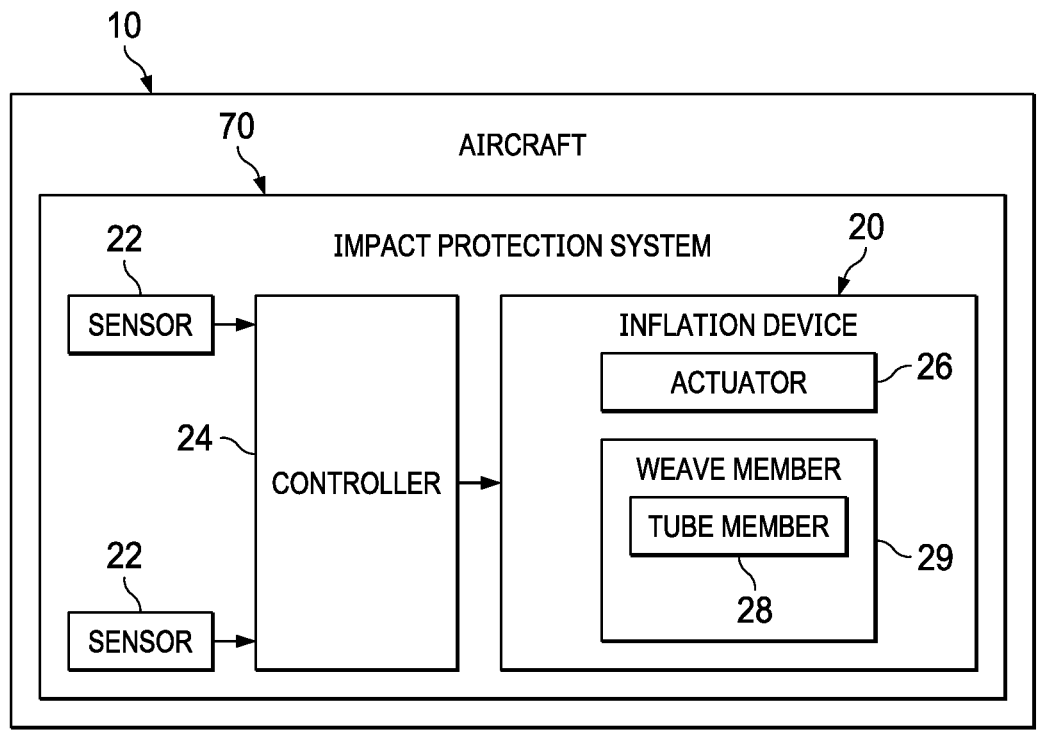
FIG. 2 is a side-view of an embodiment of the aircraft impact protection system, in accordance with the present invention.

FIG. 2 is a block diagram view of an embodiment of the aircraft impact protection system, in accordance with an embodiment of the present invention. The aircraft impact protection system 70 can include a sensor 22, a controller 24, and an inflation device 20. The aircraft impact protection system can be disposed within an aircraft 10, having one or more panels 12.

The sensor 22 can be disposed on the aircraft 10, and adapted to transmit a signal and receive a reflection of the signal. In one exemplary embodiment, the sensor 22 includes a transmitter and a receiver. In another exemplary embodiment, the transmitter and the receiver are mounted together in a single sensor housing, such as a transceiver. In another embodiment, the transmitter and the receiver are mounted in separate housings. The sensor 22 can include separate transducers for the transmitter and the receiver. In another exemplary embodiment, a single transducer is used for both transmitting the signal and receiving its reflection. Alternatively, the sensor 22 can be a RADAR device, LIDAR device, acoustic device, ultrasonic device, infrared device, micropower impulse radar (MIR) device, optical device, or other suitable device. The sensor 22 is disposed proximate a panel 12, such that an object 16 traveling toward the panel 12 can be detected prior to impact.

The controller 24 can be coupled to the sensor 22 and adapted to receive the reflection, or a signal representing a reflection of the transmitted signal, from the sensor 22 and determine whether the object 16 is proximate the panel 12. The controller 24 is preferably implemented in hardware, software, or a suitable combination of hardware and software and may comprise one or more software systems operating on a digital signal processing platform or other suitable processing platforms. As used herein, "hardware" can include a combination of discrete components, an integrated circuit, a microprocessor, a controller, a microcontroller, an application-specific integrated circuit (ASIC), an electronic data processor, a computer, a field programmable gate array (FPGA), or other suitable hardware connectable for interfacing with a network, considered to be well-known in the art. As used herein, "software" can include one or more objects, agents, threads, lines of code, subroutines, separate software applications, two or more lines of code or other suitable software structures operating in two or more software applications or on two or more processors, or other suitable hardware structures. Furthermore, it is considered that the design, development, and implementation details of all such hardware and software would be apparent to a person having ordinary skill in the art based upon a review of the present description. In one embodiment, software can include one or more lines of code or other suitable software structures operating in a general purpose software application, such as an operating system, and one or more lines of code or other suitable software structures operating in a specific purpose software application.

The controller 24 preferably determines whether the object 16 is proximate the aircraft 10 by periodically transmitting a signal and monitoring the environment for a reflection of the signal. Such reflection indicating that an object 16 is proximate the panel 12. The controller 24 can receive a reflection of the signal transmitted by the sensor 22 or a detection signal from sensor 22 indicating that a reflection was received from the sensor 22. Alternatively, the controller 24 can compare the reflection with the transmitted signal to calculate the distance to the object. The controller 24 can additionally determine the time between transmission of the signal and reception of a reflection to determine the speed of the object 16, and ultimately the time to impact, taking into account the airspeed of the aircraft 10. Alternatively, the controller 24 can determine the location, direction, and angle of trajectory of the object 16 to trigger predetermined actions. The predetermined actions can include deploying one or more inflation devices 20, altering the transmission period of the sensor 16, or object speed calculation, among others.

The inflation device 20 is preferably coupled to the controller 24 and disposed within the aircraft 10, proximate the panel 12. The inflation device 20 includes a tube member 28, a weave member 29, and an actuator 26. The tube member 28 can be made of nylon, butyl rubber, latex rubber, or other suitable material. The tube member 28 is preferably disposed within a weave member. The weave member 29 can be made of Kevlar (a trademark of E. I. du Pont de Nemours and Company) or other suitable material. Alternatively, the tube member 28 can be integrated with the weave member 29, such that the weave member 29 and the tube member 28 are a unitary member. The tube member 28 can be adapted to inflate upon activation of an actuator 26 by the controller 24. The actuator 26 is preferably coupled to the tube member 28 and adapted to inflate the tube member 28. The actuator 26 can be an airbag inflator, air pump, or other device suitable for inflating within the few millisecond inflation time. When inflated, the tube member 28 expands as the weave member 29 foreshortens and swells in diameter. The weave member 29 serves to limit the expansion of the tube member 28 to a predetermined diameter during inflation.

The inflation device 20 can be disposed along a portion of a rod and coupled to the controller 24. The inflation device 20 is adapted to exert a limited force against a portion of the panel 12 when inflated. The weave member 29 secures the uninflated tube member 28 to the rod prior to deployment. The rod is preferably sealably disposed within the tube member 28 and the weave member 29 to allow inflation therearound. Alternatively, the tube member 28 can be disposed proximate the rod, the rod 30 and the tube member 28 disposed within the weave member 29. The rod 30 is securably coupled to the aircraft 10, such that the inflation device 20 does not move away from the panel 12 during inflation. The inflation device 20 can be positioned such that the inflation device 20 exerts a force against a portion of the panel 12 when inflated. The inflation device 20 is positioned proximate the panel 12 to maintain panel 12 integrity after impact by object 16. In one exemplary embodiment, the ends of the inflation device 20 are disposed along the top of the panel 12 at the center post and side pillar of aircraft 10 to prevent the panel 14 from separating from the frame 14 while the object 16 is exerting force upon the panel 12. After deployment, the tube member 28 can sag, obscuring the pilots view. The rod 30 can include a rotating mechanism, such as a spring or motor, on one or both ends. The rotating mechanism allows the rod 30 to rotate about its length, causing the sagging tube member 28 and weave member 29 to be furled around the rod. The rotating mechanism can be activated manually via a switch or other suitable device, or automatically controlled by the controller. Alternatively, the rod can be detachably secured to the aircraft such that one or both sides of the rod can be detached from the aircraft to provide an unobstructed view.

In operation, the sensor 22 transmits a signal away from the aircraft 10. When an object enters the transmission range of the sensor 22 disposed on the aircraft 10, the sensor 22 receives a reflection that is bounced off the object 16. The controller 24 determines whether the object 16 is proximate the aircraft 10 by processing the reflection or a detection signal received from sensor 22. After determining that the object is proximate the panel, the controller 24 activates the actuator 26 of the inflation device 20 such that the tube member 28 inflates, buttressing at least a portion of the panel 12. After deployment, the controller 24 automatically activates the rotating mechanism, after a predefined time period, furling the tube member 28 and the weave member 29 around the rod and thereby clearing the pilots view.

Figure 3:
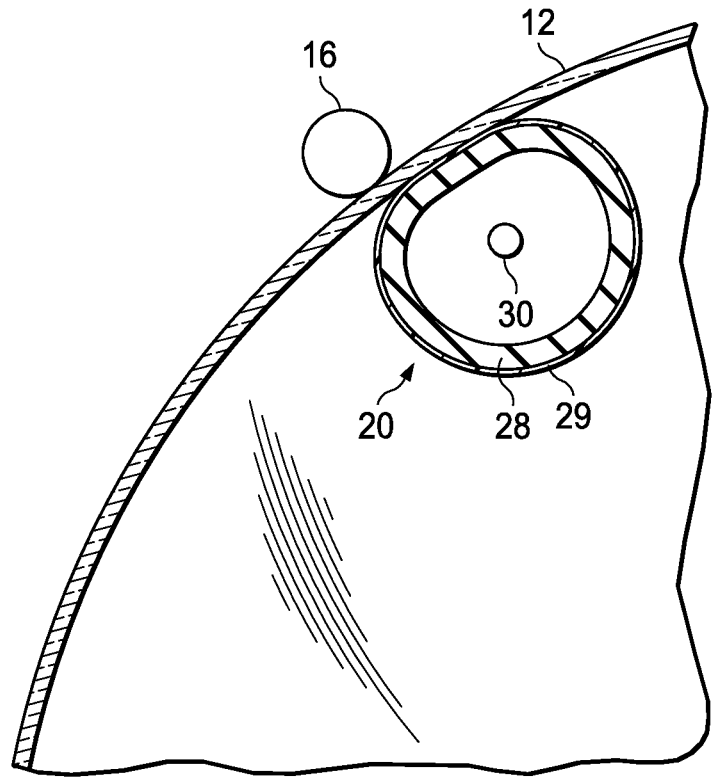
FIG. 3 is a side-view of another embodiment of the aircraft impact protection system, in accordance with the present invention.

FIG. 3 is a cross-section view of an embodiment of the aircraft impact protection system 70 in a deployed state, in accordance with an embodiment of the present invention. In one exemplary embodiment, the tube member 28 and the weave member 29 are disposed partially around the rod 40. The weave member 29 limits the diametric expansion of the tube member 28 such that the panel 12 is buttressed from separation from the frame 14, due to impact of an object 16, without pushing the panel 12 out of the frame 14.

Figure 4A:
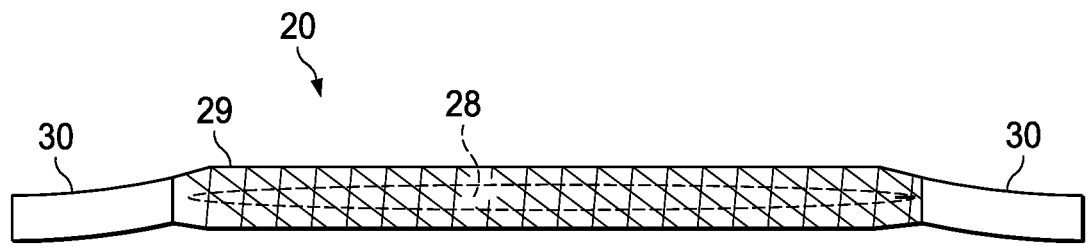
FIG. 4A is a side-view of an embodiment of the aircraft impact protection system in an undeployed state, in accordance with an embodiment of the present invention.

FIG. 4A is a side-view of an embodiment of the aircraft impact protection system in an undeployed state, in accordance with an embodiment of the present invention. The weave member 29 is formed similar to a "finger cuff," via a cylindrical, helically wound braid, such as a biaxial braid. The weave member 29 is lengthened and diametrically narrowed when it is pulled from each side. In this way, the tube member 28 is secured around the rod 30.

Figure 4B:
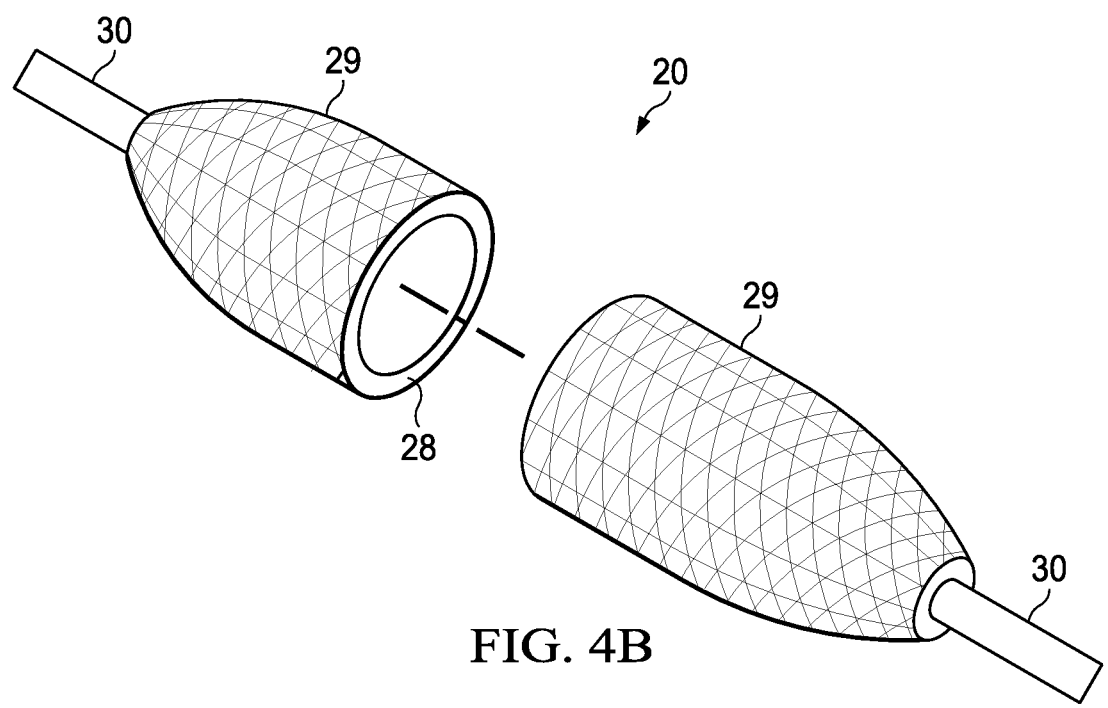
FIG. 4B is a perspective view of a cross-section of an embodiment of the aircraft impact protection system in a deployed state, in accordance with an embodiment of the present invention.

FIG. 4B is a perspective view of a cross-section of an embodiment of the aircraft impact protection system in a deployed state, in accordance with an embodiment of the present invention. The weave member 29 is foreshortened and diametrically expanded when the tube member 28 is inflated within the weave member 29. The tube member 28 inflates around the rod 30, but is limited in its expansion to the maximum diameter allowed by the foreshortening of the weave member 29.

Figure 5:
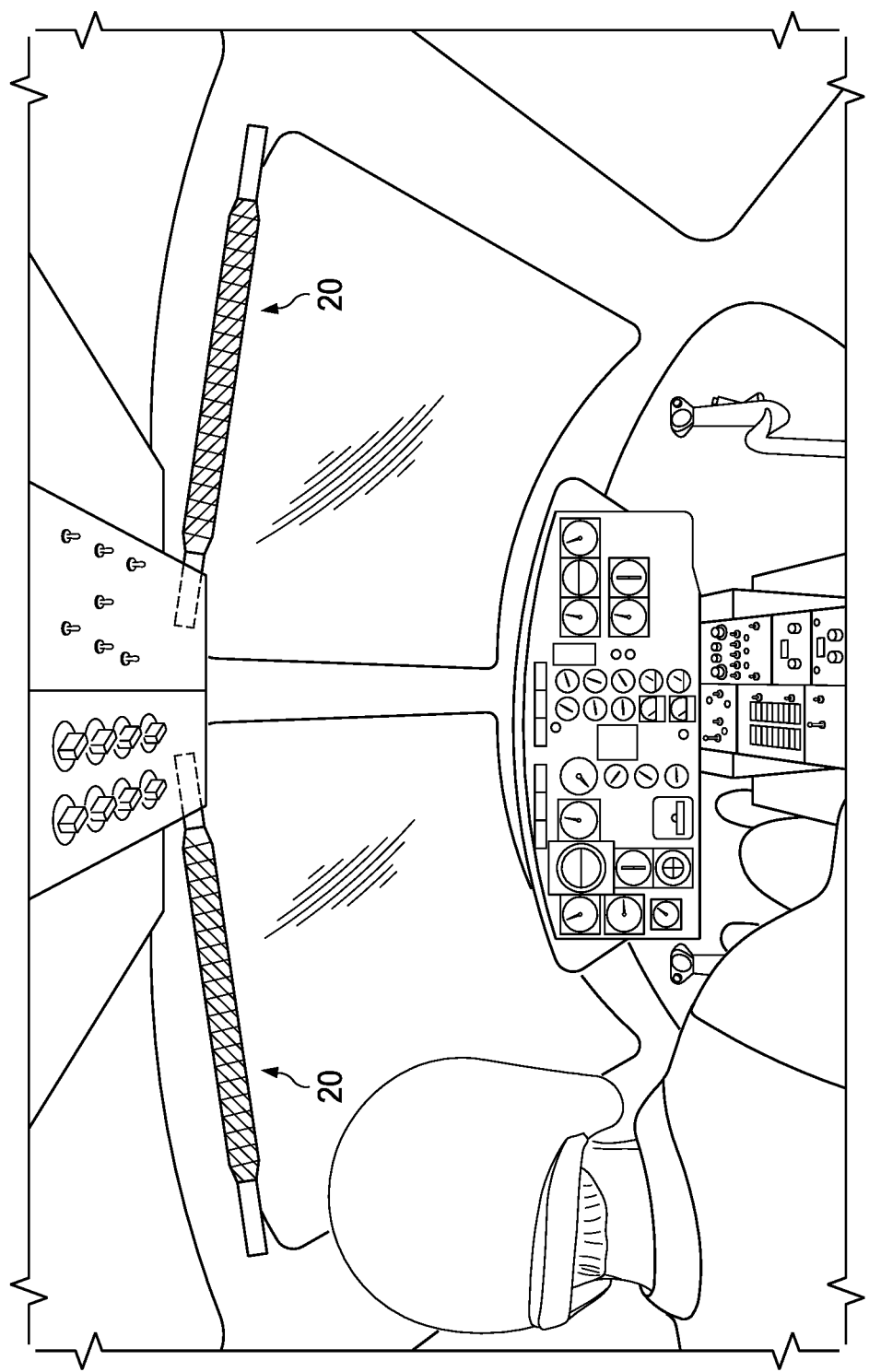
FIG. 5 is side-view of an embodiment of the aircraft impact protection system in an undeployed state, in accordance with an embodiment of the present invention.

FIG. 5 is a side-view of an embodiment of the aircraft impact protection system 70 in an undeployed state, in accordance with an embodiment of the present invention. The inflation device 20 does not impede the pilots view in an undeployed state. The inflation device 20 can be disposed behind the panel 12 on the right side of the aircraft 10, behind the panel 12 on the left side of the aircraft 10, or behind both panels 12. The sensor 22 can also be disposed on the left side of the aircraft 10 to correspond with detection of an object 16 headed toward the left side of the aircraft 10. Alternatively, the sensor 22 can have a transmission and reception swath large enough to identify the object 16 approaching both the left side and right side of the aircraft 10. The ends of the inflation device 20 can be disposed along the top of the panel 12 at the center post and side pillar of aircraft 10 to prevent the panel 14 from separating from the frame 14 while the object 16 is exerting force upon the panel 12.

Figure 6:
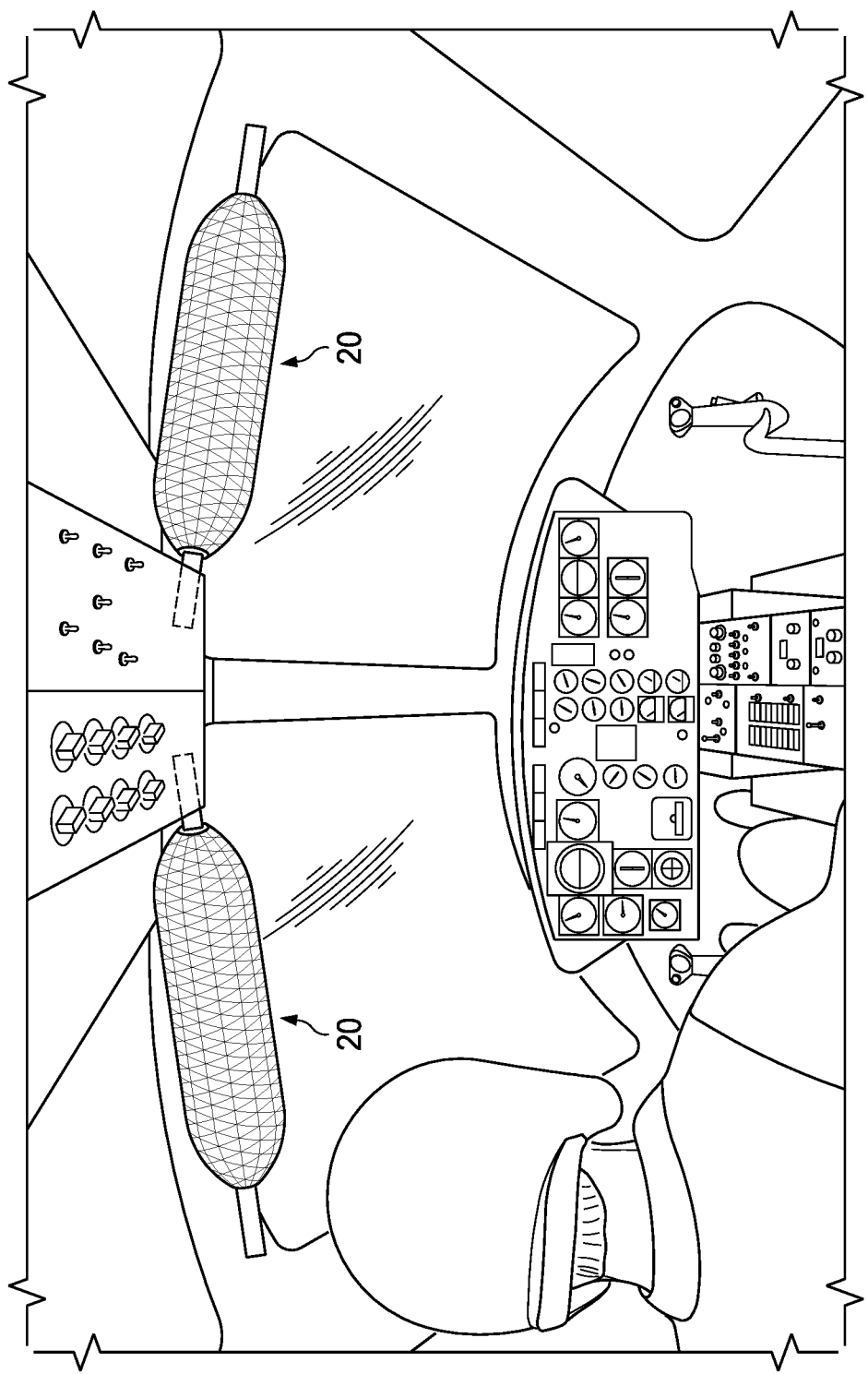
FIG. 6 is a perspective view of a cross-section of an embodiment of the aircraft impact protection system in a deployed state, in accordance with an embodiment of the present invention.

FIG. 6 is a perspective view of a cross-section of an embodiment of the aircraft impact protection system in a deployed state, in accordance with an embodiment of the present invention. The inflation device 20 can be positioned such that the inflation device 20 exerts a force against a portion of the panel 12 when inflated. The inflation device 20 is positioned proximate the panel 12 to maintain panel 12 integrity after impact by object 16. The inflation device 20 on the left side of the aircraft inflates when an object is detected in front of the left-side panel 12. The inflation device 20 on the right side of the aircraft inflates when an object is detected in front of the right-side panel 12. If more than one inflation device 20 is utilized, all inflation devices 20 can be inflated simultaneously or only a specified subset.

Figure 7:
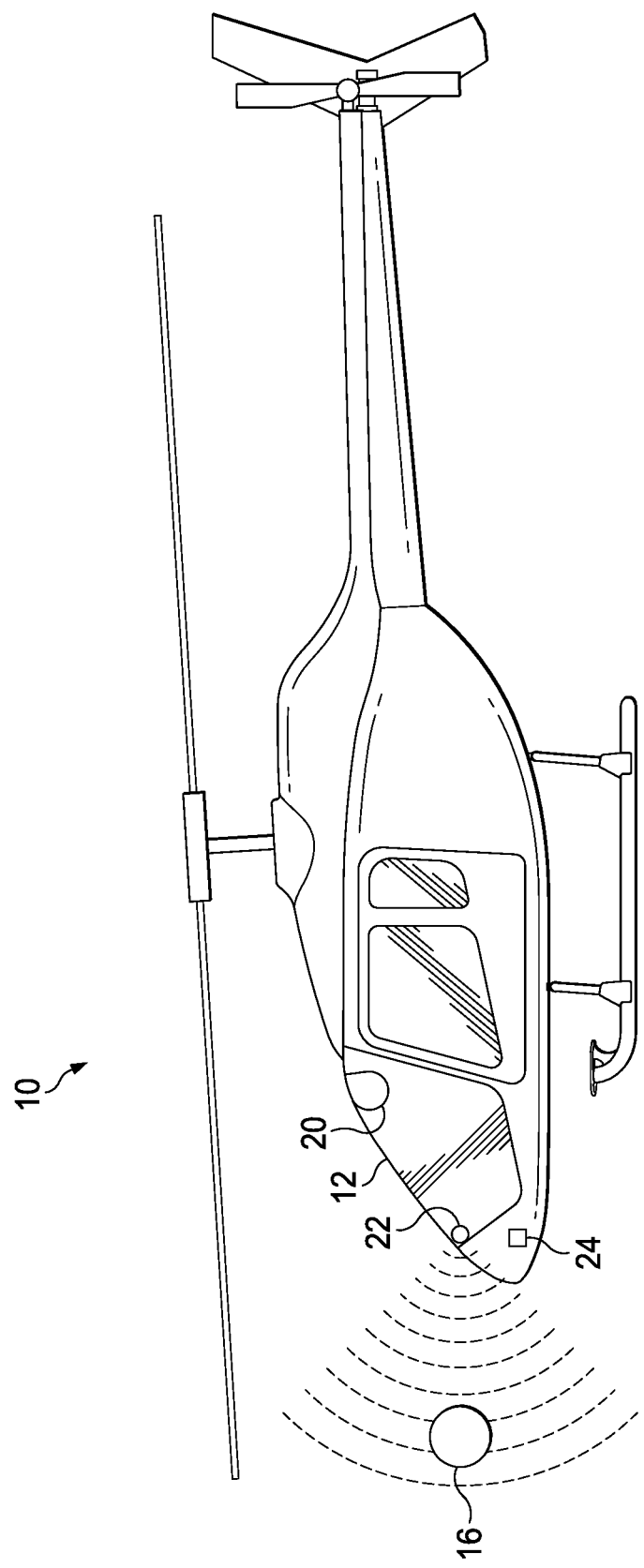
FIG. 7 is a block diagram view of an embodiment of the aircraft impact protection system, in accordance with an embodiment of the present invention.

FIG. 7 is a side-view of an embodiment of an aircraft impact protection system, in accordance with the present invention. In one exemplary embodiment, the sensor 22 can be positioned at the fore of the aircraft 10 to detect an object 16 headed toward a panel 12 (such as a windshield or fuselage member) of the aircraft 10. The sensor 22 is operatively connected to the controller 24, which can activate and deactivate the sensor 22. The controller 24 is operably coupled to the inflation device 20 and is capable of deploying the inflation device 20 to buttress the panel 12. This embodiment helps prevent windshield damage and penetration of an object into the cockpit.

Figure 8:
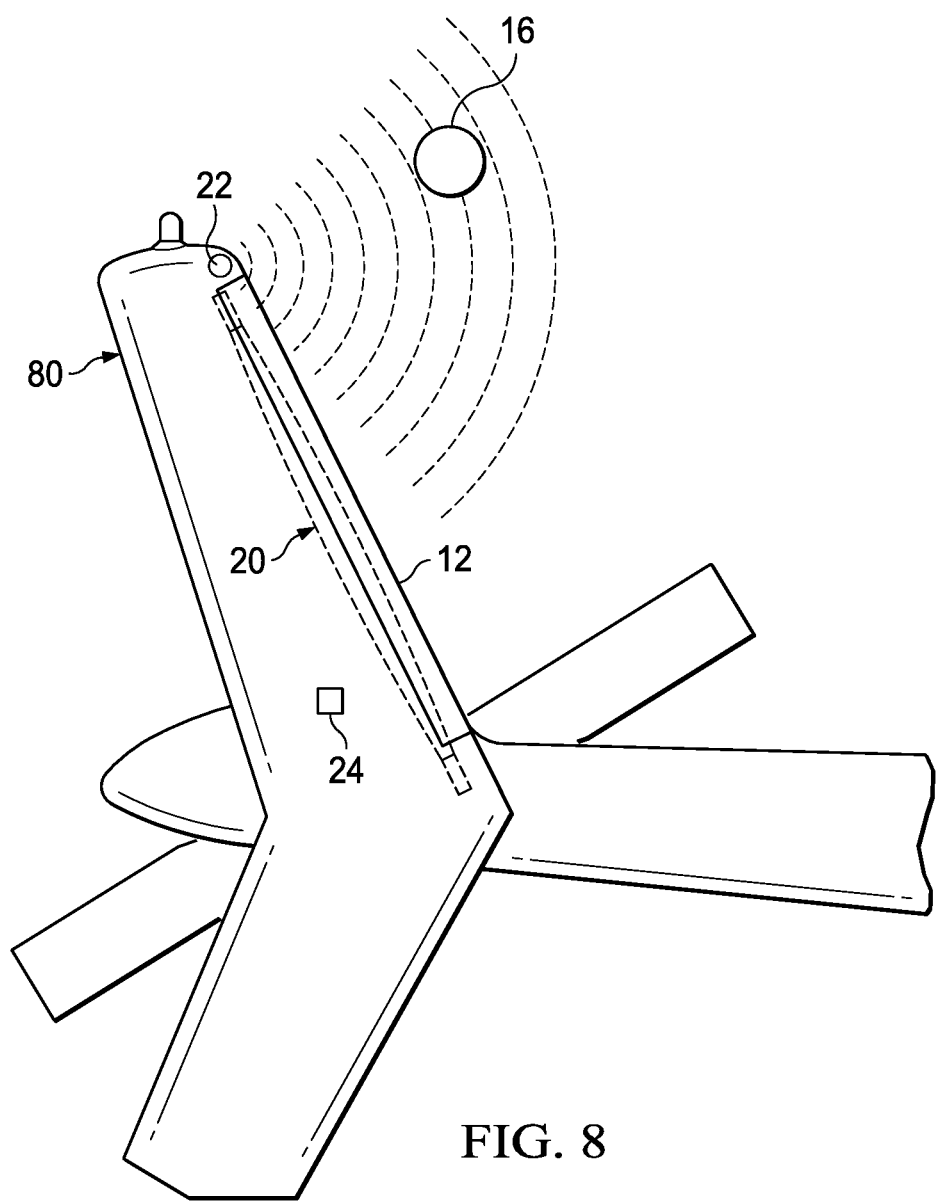
FIG. 8 is a cross-section view of an embodiment of the aircraft impact protection system in a deployed state, in accordance with an embodiment of the present invention.

FIG. 8 is a side-view of another embodiment of the aircraft impact protection system, in accordance with the present invention. In another exemplary embodiment, the sensor 22 can be positioned at the aft of the aircraft 10 to detect an object 16 headed toward a panel 12 (such as a vertical fin or fuselage member) of the aircraft 10. The sensor 22 is operatively connected to the controller 24, which can activate and deactivate the sensor 22. The controller 24 is operably coupled to the inflation device 20 and is capable of deploying the inflation device 20 to buttress the panel 12. This embodiment helps prevent vertical fin damage, which can damage internal components and cause aircraft malfunction.

An invention has been provided with several advantages. The impact protection device allows an aircraft to overcome object impact while maintaining the integrity of the aircraft. Additionally, the present invention allows protection of panels without increasing the thickness of existing panels, thereby adding weight to an aircraft. Finally, the present invention allows new and existing aircraft to comply with 37 CFR § 29.631, which requires the ensured capability of continued safe flight and landing after a bird strike.

While the invention has been shown in one of its forms, it is not thus limited and is susceptible to various changes and modifications without departing from the spirit thereof.

What is claimed is:

1. An impact protection system, comprising: an aircraft having a panel;

a sensor disposed on the aircraft and adapted to transmit a signal and receive a reflection of the signal;

a controller coupled to the sensor and adapted to receive the reflection from the sensor and determine whether an object is proximate the panel; and an inflation device, having a tube member, coupled to the controller and disposed within the aircraft, proximate an internal portion of the panel, wherein, after determining that the object is proximate the panel, the controller activates the inflation device such that the tube member inflates within the aircraft, internally buttressing at least an internal portion of the panel against an external impact to the panel.

2. The system of claim 1, wherein the tube member is disposed within a weave member.

3. The system of claim 1, wherein the tube member is integrated with a weave member.

4. The system of claim 2, further comprising an actuator coupled to the tube member and adapted to inflate the tube member.

5. The system of claim 1, wherein the weave member limits the expansion of the tube member during inflation.

6. The system of claim 1, wherein the panel is a windshield.

7. The system of claim 1, wherein the sensor is located on the right-side of the aircraft.

8. The system of claim 1, wherein the sensor is located on the left-side of the aircraft.

9. The system of claim 1, wherein the inflation device is disposed along a portion of a rod, the rod securably coupled to the aircraft.

10. A method for buttressing a windshield of an aircraft during impact, comprising:

transmitting a signal and receiving a reflection of the signal;

determining whether an object is proximate the windshield based on the reflection; and, buttressing an internal portion of the windshield when an object is proximate the windshield by deploying an inflation device, such that the windshield is internally buttressed against an external impact of the object on the windshield.

11. The method of claim 10, wherein the inflation device buttresses a portion of the windshield with an inflated tube member.

12. The method of claim 11, wherein the inflation device is positioned such that the inflation device exerts a force against a portion of the windshield when inflated.

13. The method of claim 10, further comprising positioning the inflation device proximate the windshield to maintain windshield integrity after object impact.

14. The method of claim 10, further comprising furling the tube member around a rod after deployment.

15. An aircraft impact protection system, comprising: an aircraft having a windshield;

a sensor disposed on the aircraft and adapted to transmit a signal and receive a reflection of the signal;

a controller coupled to the sensor and adapted to receive the reflection from the sensor and determine whether an object is proximate the windshield;

a rod securably coupled to the aircraft, proximate the windshield; an inflation device, disposed along a portion of the rod and coupled to the controller, the inflation device adapted to inflate within the aircraft and exert a force against an internal portion of the windshield when inflated to internally buttress at least a portion of the windshield against an external impact of the object on the windshield.

16. The system of claim 15, wherein the inflation device includes a tube member disposed within a weave member.

17. The system of claim 15, wherein the inflation device includes a tube member integrated with a weave member.

18. The system of claim 16, further comprising an actuator coupled to the tube member and adapted to inflate the tube member.

19. The system of claim 15, wherein the sensor is a transceiver.

20. The system of claim 15, wherein the sensor includes a transmitter and a receiver.

* * * * *